(12) United States Patent
Elmieh et al.

(10) Patent No.: US 8,026,910 B2
(45) Date of Patent: Sep. 27, 2011

(54) OFFLINE OPTIMIZATION PIPELINE FOR 3D CONTENT IN EMBEDDED DEVICES

(75) Inventors: Baback Elmieh, Carlsbad, CA (US); James Ritts, San Diego, CA (US); David L. Durnil, San Diego, CA (US); Maurya Shah, Gujarat (IN)

(73) Assignee: QUALCOMM Incorporated, San Diego, CA (US)

( * ) Notice: Subject to any disclaimer, the term of this patent is extended or adjusted under 35 U.S.C. 154(b) by 1153 days.

(21) Appl. No.: 11/478,864

(22) Filed: Jun. 29, 2006

(65) Prior Publication Data

US 2007/0109298 A1    May 17, 2007

Related U.S. Application Data (60) Provisional application No. 60/696,347, filed on Jun. 29, 2005, provisional application No. 60/696,185, filed on Jun. 29, 2005, provisional application No. 60/696,488, filed on Jun. 29, 2005, provisional application No. 60/696,346, filed on Jun. 29, 2005, provisional application No. 60/696,186, filed on Jun. 29, 2005.

(51) Int. Cl.
*G06T 15/00* (2006.01)

(52) U.S. Cl. ........ 345/419; 345/519; 345/613; 345/473; 345/503; 345/522; 710/15; 710/18; 715/717; 715/735; 715/771; 715/966

(58) Field of Classification Search .................. 345/419, 345/519, 613, 473, 503, 522; 710/15, 18; 715/717, 735, 771, 966

See application file for complete search history.

(56) References Cited

U.S. PATENT DOCUMENTS

| | | | | |
|---|---|---|---|---|
| 6,263,496 | B1 * | 7/2001 | Meyer et al. | 717/114 |
| 6,272,650 | B1 * | 8/2001 | Meyer et al. | 714/38 |
| 6,477,563 | B1 * | 11/2002 | Kawamura et al. | 709/202 |
| 6,842,178 | B2 * | 1/2005 | Simons | 345/473 |
| 6,987,516 | B2 * | 1/2006 | Dery | 345/582 |
| 7,027,056 | B2 * | 4/2006 | Koselj et al. | 345/519 |
| 7,251,506 | B2 * | 7/2007 | Yasutake | 455/567 |
| 7,388,579 | B2 * | 6/2008 | O'Gorman et al. | 345/211 |

(Continued)

FOREIGN PATENT DOCUMENTS

JP    2004199142    7/2004

OTHER PUBLICATIONS

Masatoshi K et al, 3D Graphics LSI Core for Mobile Phone "Z3D", Proceedings of the ACM Siggraph/Eurographics Conference on Graphics Hardware, Jul. 2003, p. 61, col. 1, lines 1-16, pp. 65,66.

(Continued)

*Primary Examiner* — Phu Nguyen (74) *Attorney, Agent, or Firm* — Timothy F. Loomis; James R. Gambale, Jr.

(57) ABSTRACT

Apparatus are provided including assets defining 3D models, including 3D icons and scenes, and animations of the 3D models. An offline optimization engine is provided to process data to be acted upon by a graphics engine of a target embedded device. A graphics engine simulator is provided to simulate, on a computer platform other than a target embedded device, select functions of a target embedded device running a graphics engine including API calls that directly calls API functions of a hardware level API of the target embedded device.

60 Claims, 10 Drawing Sheets

U.S. PATENT DOCUMENTS

| | | | |
|---|---|---|---|
| 7,406,329 B2 * | 7/2008 | Khurana et al. | 455/552.1 |
| 7,577,911 B2 * | 8/2009 | Oswalt | 715/744 |
| 7,593,015 B2 * | 9/2009 | Rao | 345/473 |
| 7,719,532 B2 * | 5/2010 | Schardt et al. | 345/420 |

OTHER PUBLICATIONS

Leavitt N, Will Wireless gaming be a winner?, Computer IEEE Comput. Soc USA, vol. 36, No. 1, Jan. 2003, pp. 24-27.

Bing-Yu Chen et al, JavaGL—A 3D graphics library in Java for Internet browsers, IEEE Transactions on Consumer Electronics IEEE USA, vol. 43, No. 3, Aug. 1997, pp. 271-278.

Lawton G, Moving Java into mobile phones, Computer IEEE Comput. Soc USA, vol. 35, No. 6, Jun. 2002, pp. 17-20.

Paltashev T et al, Simulation of hardware support for OpenGL graphics architecture, Proceedings International Conference on Information Technology: Coding and Computing (Cat. No. PR00540) IEEE Comput. Soc Los Alamitos, CA, USA, 2000, pp. 295-300.

Crisu D et al, Graal—A development framework for embedded graphics accelerators, Design, Automation and Test in Europe Conference and Exhibition, 2004. Proceedings Feb. 16-20, 2004, Piscataway, NJ, USA, IEEE, vol. 2, pp. 1366-1367.

Chehimi F et al, Evolution of 3D games on mobile phones, International Conference on Mobile Business IEEE Computer Society Los Alamitos, CA, USA, 2005, pp. 173-179.

Pulli K et al, Designing graphics programming interfaces for mobile devices, IEEE Computer Graphics and Applications IEEE USA, vol. 25, No. 6, Nov. 2005, pp. 66-75.

International Search Report and Written Opinion—PCT/US2006/025954, International Search Authority—European Patent Office—Jan. 22, 2007.

* cited by examiner

OFFLINE OPTIMIZATION PIPELINE FOR 3D CONTENT IN EMBEDDED DEVICES

CROSS REFERENCE TO RELATED APPLICATIONS

Priority is hereby claimed to U.S. Provisional Patent Application Nos. 60/696,347, 60/696,185, 60/696,488, 60/696,346, and 60/696,186 each filed Jun. 29, 2005.

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

FIELD OF THE DISCLOSURE

Aspects of the disclosure relate to tools to facilitate the development and implementation of 3D content used in embedded devices. Other aspects of the disclosure relate to tools to optimize such 3D content. The embedded devices may be mobile devices that capture, receive, and/or transmit voice, data, text, and/or images.

BACKGROUND OF THE DISCLOSURE

Various systems exists which facilitate the development and implementation of 3D content used in embedded devices. Such embedded devices generally included displays to display the 3D content. In this regard, Qualcomm Corporation sells many software products under the trade name BREW™, which include, for example, SDKs which can be run on a given computer platform to develop programs for providing 3D content in embedded devices, just as mobile phones.

SUMMARY OF THE DISCLOSURE

In accordance with one embodiment, apparatus are provided which include assets defining 3D models, including 3D icons and scenes, and animations of the 3D models. An offline optimization engine is provided to process data to be acted upon by a graphics engine of a target embedded device. A graphics engine simulator is provided to simulate, on a computer platform other than a target embedded device, select functions of a target embedded device that runs a graphics engine including API calls that directly call API functions of a hardware level API of the target embedded device.

BRIEF DESCRIPTION OF THE DRAWINGS

Non-limiting example embodiments of the disclosure are further described in the detailed description, which follows, by reference to the noted drawings, in which like reference numerals represents similar parts throughout the several views of the drawings, and wherein.

DETAILED DESCRIPTION

Figure 1:
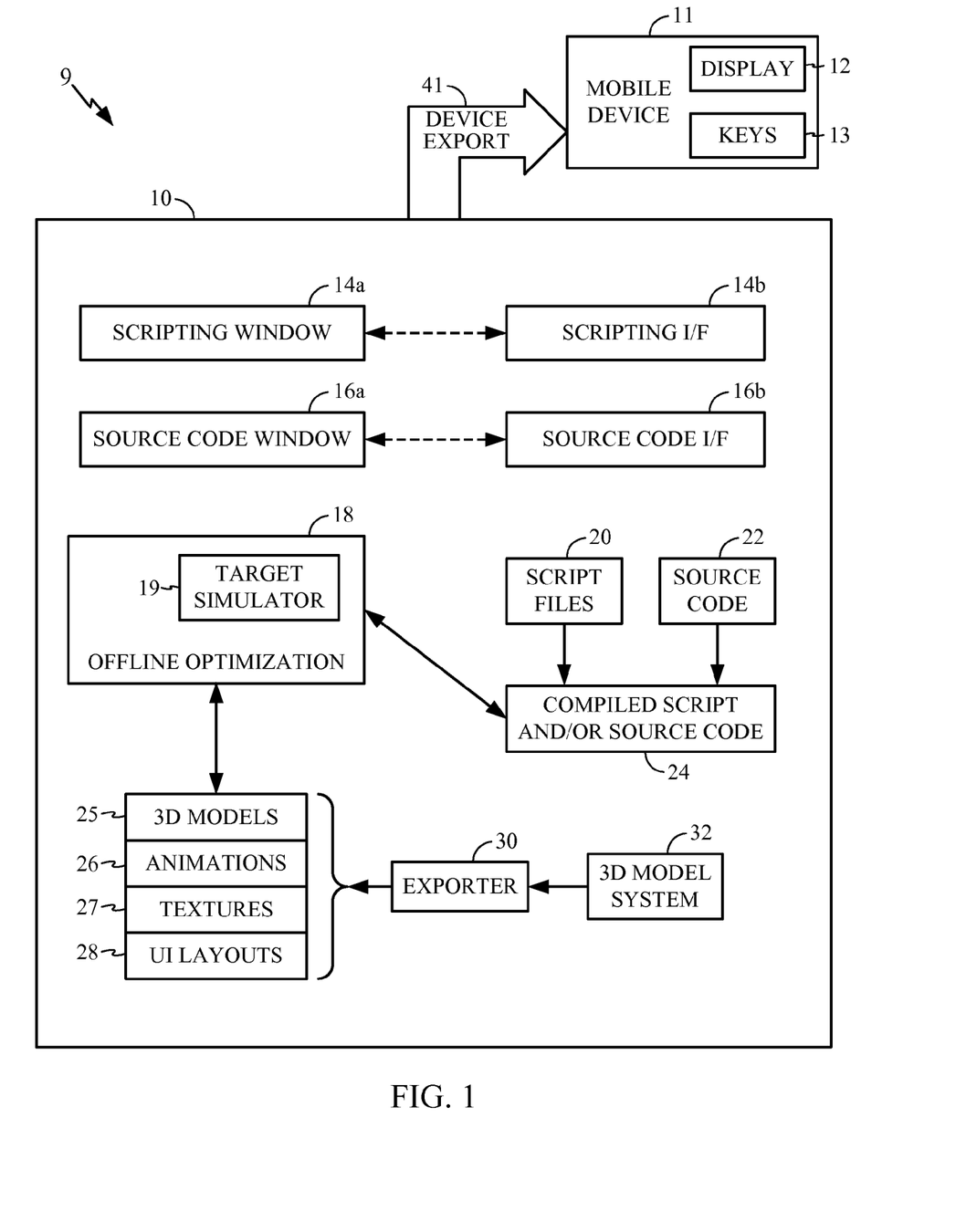
FIG. 1 is a block diagram of one or more device content development platforms.

Referring now to the drawings in greater detail, FIG. 1 illustrates a 3D content development system 9. The illustrated system 9 includes one or more device content development platforms 10, and a mobile device 11. The illustrated mobile device 11 includes a display 12 and keys 13. The illustrated display 12 may be caused to display a 3D graphical virtual interface which includes 3D icons and scenes. In this regard, a 3D icon application may be developed which include icon association mechanisms to associate a given 3D object in a scene with a mobile device interface tool to cause, by manipulation of the given 3D object, at least one of an input and output of a signal or information regarding the mobile device. The mobile device may be, for example, a mobile phone. The input may involve a controlling function of the mobile device, a switch state change of the mobile device, or text input of the mobile device. An output may involve information display, a state of the device, or a status indication regarding the mobile device. The information that is input or output via use of such a 3D graphical virtual interface, including 3D icons, may be regarding operations, settings, events, states, and/or statuses of mobile device 11.

The illustrated mobile device 11 is one type of embedded device, which captures, receives, and/or transmits voice, data, text, and/or images. The illustrated mobile device 11 includes a display 12 and keys 13, to allow the control of mobile device 11 and the input of information into mobile device 11.

The illustrated device content development platform(s) 10 may be a single or a distributed platform, or may include multiple platforms. The illustrated platform set includes a number of software interfaces which interact with and provide corresponding windows or screens on a computer platform. These include a scripting window 14a and a corresponding scripting language interface 14b. A source code window 16a is provided which corresponds to a source code interface 16b. Each of the interfaces 14b and 16b is operable through the use of its corresponding window, 14a and 16a, for receiving controls and information via a computer screen and for displaying information to the user.

The illustrated platform set 10 is further provided with an offline optimization engine 18, which may include a target simulator 19.

Scripting language interface 14b is coupled to, and generates, one or more script files 20, which cater to the building of 3D user interfaces on a target embedded device. Those script files 20 provide information for 3D icon and scene definition as well as for programming the animation of the defined 3D icons and scenes.

Source code interface 16b, in connection with source code window 16a, allows for the creation of a program using source code, typically using commands provided in code provided for original equipment manufacturers (OEMs).

A 3D model system 32 may be provided for allowing an artist to perform 3D modeling and/or image processing to create 3D user interface assets, and to define user interface layouts, to each form and ultimately define a 3D user interface. An exporter 30 may be provided to export files, i.e., convert such files, from 3D model system 32 into certain types of files that can be useable by the compiled script and/or source code 24 to cause a particular type of 3D user interface which can be exported to a target embedded device. The "exporting" performed by exporter 30 is distinct from the exporting performed by device export interface 41, which is provided to export resulting code and data to a target embedded device, such as mobile device 11. Exporter 30 converts information into files that are compatible with the compiled script and/or source code 24 (and also useable by a graphics engine that operates in accordance with the compiled code), while device export interface 41 facilitates the physical exporting of such compiled script and/or source code and associated user interface assets and user interface layout files, into mobile device 11.

In the illustrated embodiment, exporter 30 exports information from 3D modeling system 32 into a set of files defining user interface assets 25, 26, and 27, and a set of files defining user interface layouts 28. Specifically, the user interface assets include 3D models 25, animations 26, and textures 27.

Figure 2:
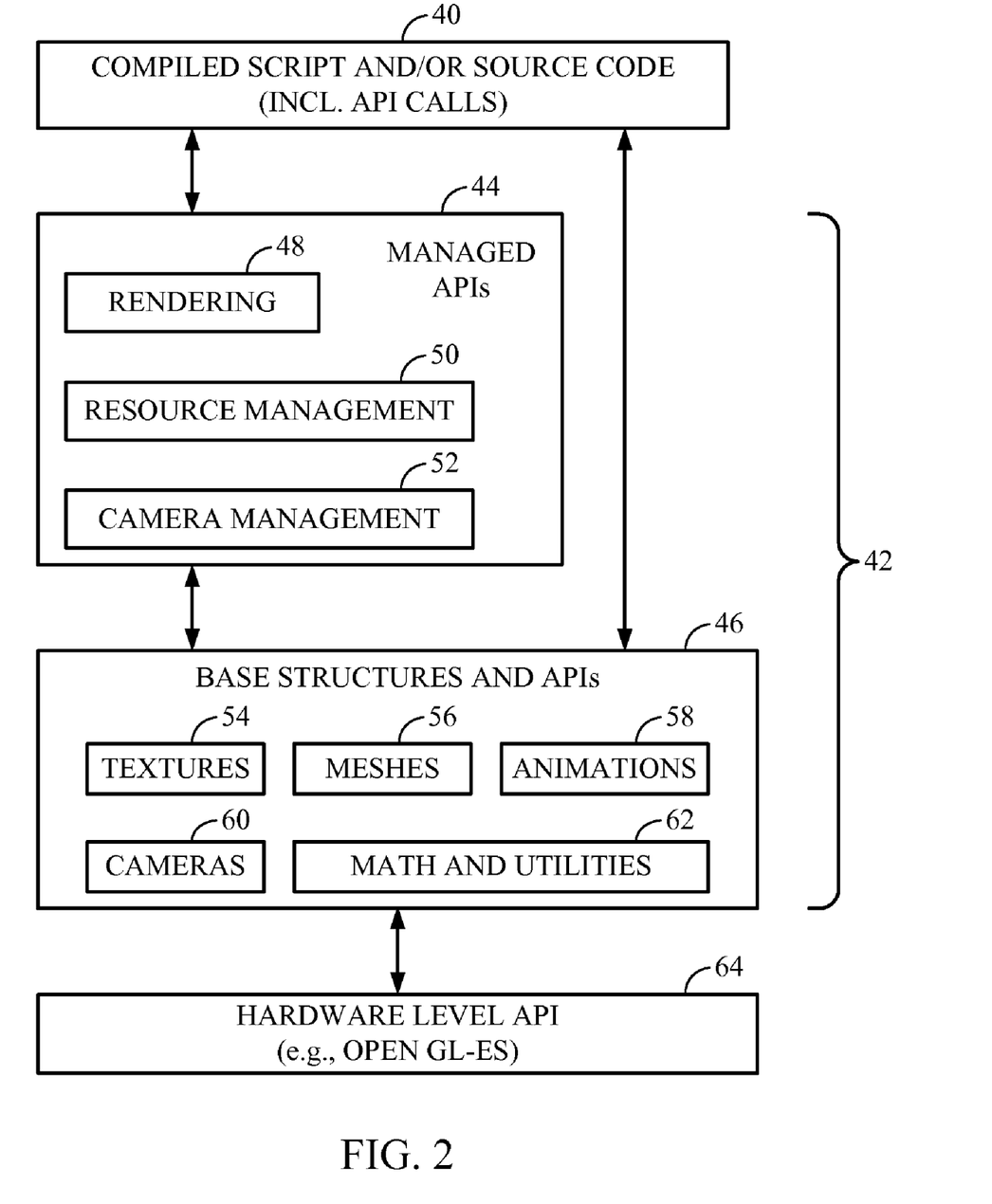
FIG. 2 is a block diagram illustrating an embodiment of the software architecture in a target embedded device.

Offline optimization engine 18 may include a target simulator 19 that simulates a graphics engine to simulate, on a computer platform other than a target embedded device (i.e., platform(s) 10) select functions of a target embedded device running a graphics engine, for example, the graphics engine illustrated in FIG. 2.

FIG. 2 provides an architectural diagram of software as it exists once exported into a target embedded device, such as mobile device 11. The architecture includes compiled script and/or source code 40 (which includes API calls), managed APIs 44, base structures and APIs 46, and a hardware level API 64. The compiled script and/or source code communicates directly with, i.e., performs API calls to API functions within, each of managed APIs 44 and base structures APIs 46. The managed APIs 44 include a rendering API 48, a resource management API 50, and a camera management API 52. Rendering API 48 takes care of memory management, render states, and other bookkeeping tasks.

The base structures and APIs 46 include textures 54, meshes 56, animations 58, cameras 60, and math and utilities 62. These structures and APIs provide full access to all geometry, animation streams, and other underlying engine data types. In addition, fixed point math and container structures may be provided that can be used independently of the rest of the engine. Applications may be implemented, embodied within compiled script and/or source code 40, so as to interface through managed APIs 44 for some or all functions. They may implement their own resource management and memory instantiation techniques, and, accordingly, interface directly with base structures and APIs 46. Moreover, completely bypassing managed APIs 44 is possible in the event an OEM developer wishes to write source code that takes advantage of exporter and mesh optimization tools or otherwise retain control over how higher-level functionality is implemented.

Managed APIs 44 together with base structures and APIs 46 comprise an optimization engine layer 42. The hardware level API 64, may include, for example, Open GL-ES software, Direct 3D mobile software, or SKT GIGA software.

Figure 3:
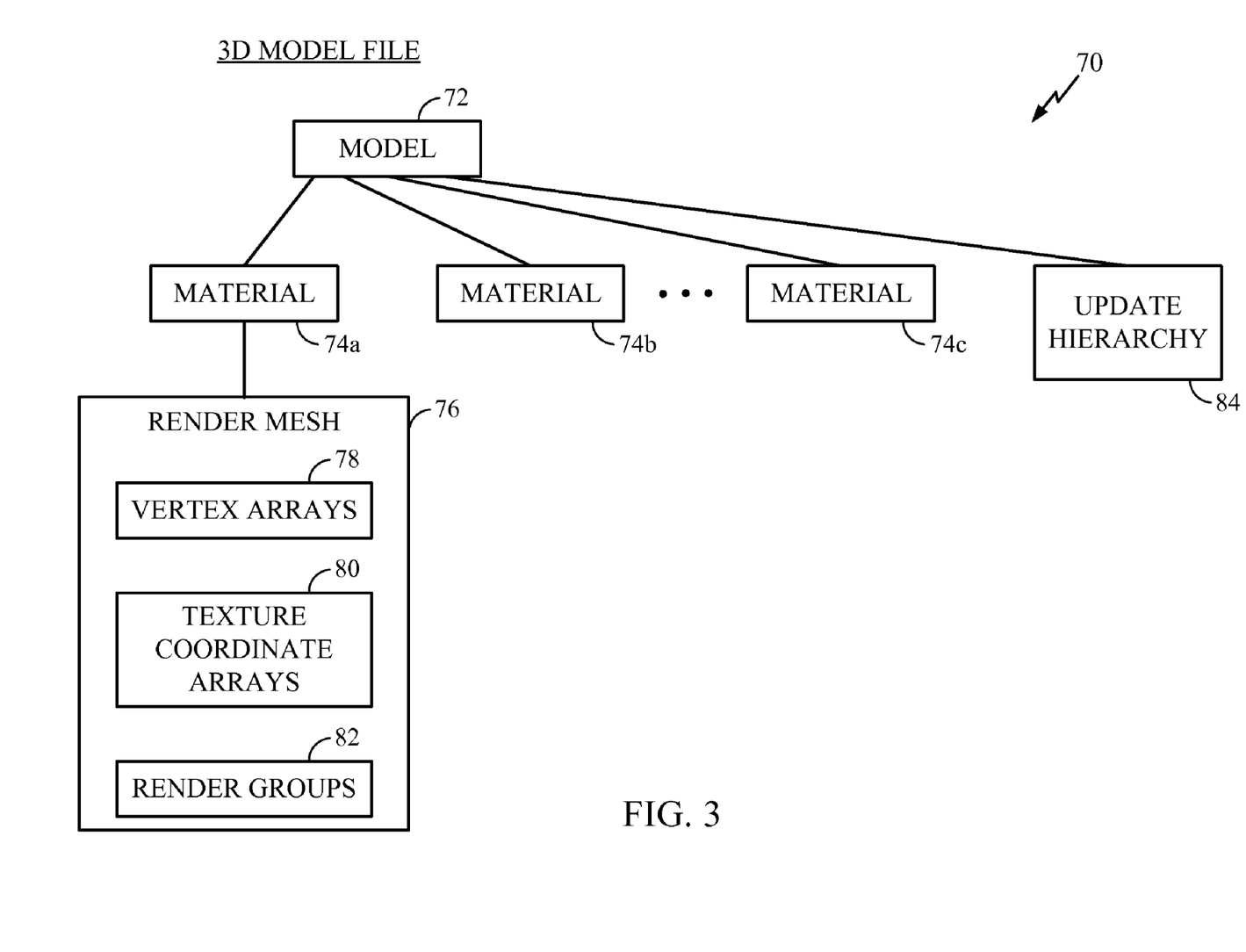
FIG. 3 is a schematic diagram of an example data structure of a 3D model file.

FIG. 3 schematically shows one embodiment of the data structure of a 3D model file 70. A given 3 model file 70 includes an identifier 72 identifying the model 72 and sets of material parameters 74a, 74b, . . . 74c, defining the manner in which geometry for that model can be drawn. A particular material 74a, for example, may have a particular texture and mapping color of the mesh, a particular transparency value, and a particular incandescence value. Material information 74a includes these rendering parameters. A render mesh 76 is provided that corresponds to a given set of material parameters 74a. In the illustrated structure, render mesh 76 includes vertex arrays 78, texture coordinate arrays 80, and render groups 82. The render groups 82 include groups of render primitives (triangle-strips, triangle-lists, and so on). One or more update hierarchies 84 may be provided, which are used for animations and for transforming render groups from local space to world space.

Figure 4:
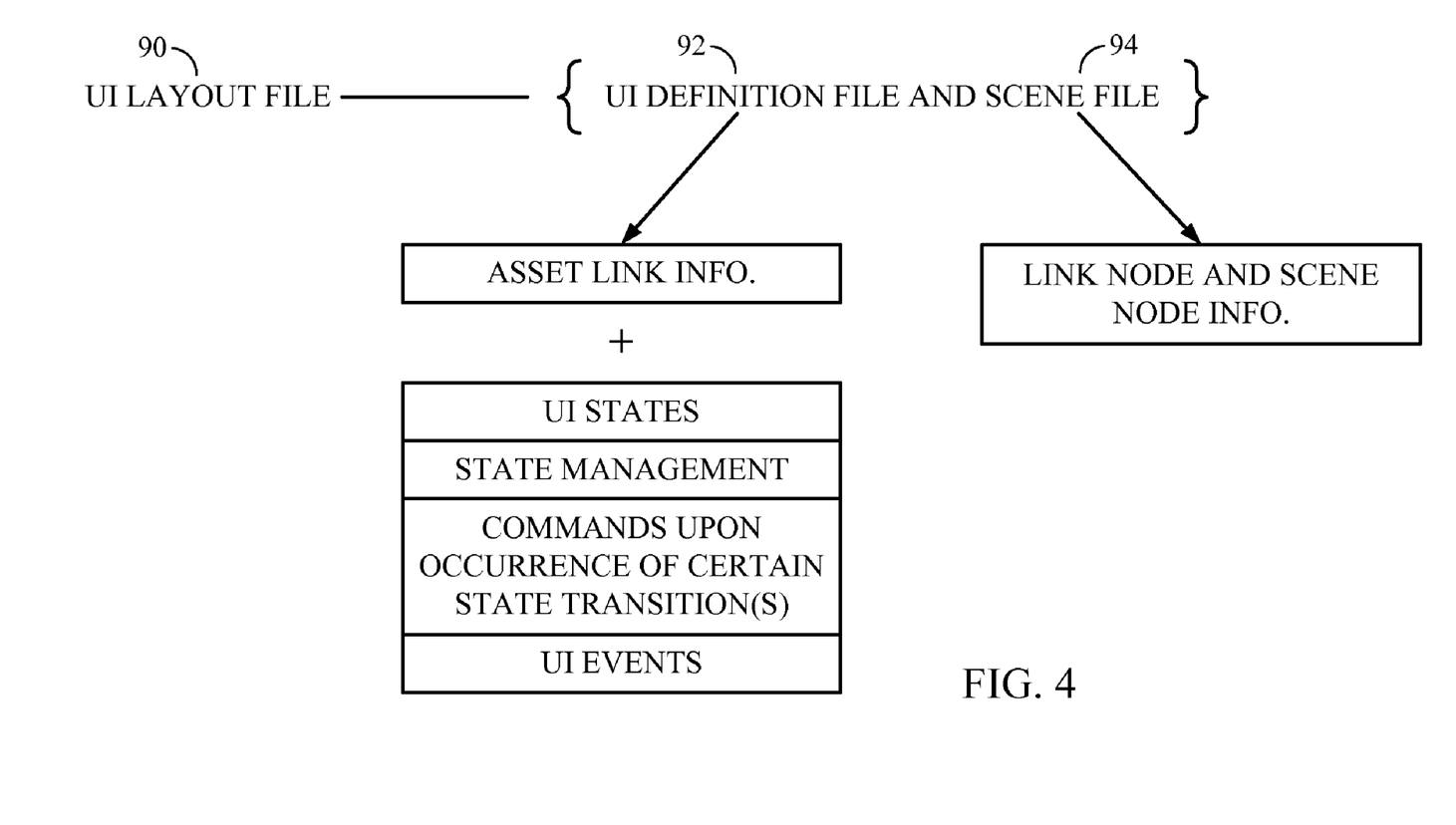
FIG. 4 is a schematic diagram of an example data structure of a user interface (UI) layout file.

FIG. 4 schematically depicts a data structure of a user interface layout file 90. A UI layout file 90 includes a UI definition file 92 and a scene file 94. UI definition file 92 includes asset link information and other information including UI states; state management; commands upon occurrence of certain state transitions; and UI events. Scene file 94 includes link node information and scene node information.

Scene nodes are all those nodes that are not linked to a 3D model. Link nodes have 3D models associated therewith. The models associated with link nodes are exported to their own files, and their link node association is specified in the UI definition file 92. Scripting language may be used to provide a set of tags that could be used in connection with externally created 3D assets, otherwise referred to as user interface assets, and produced by another set of software, 3D model system 32 as shown in FIG. 1. These files produced by this external software are exported by exporter 30, and thereby converted into formats compatible with the 3D user interface development code 24 as compiled from script files 20 and/or source code 22.

Figure 5:
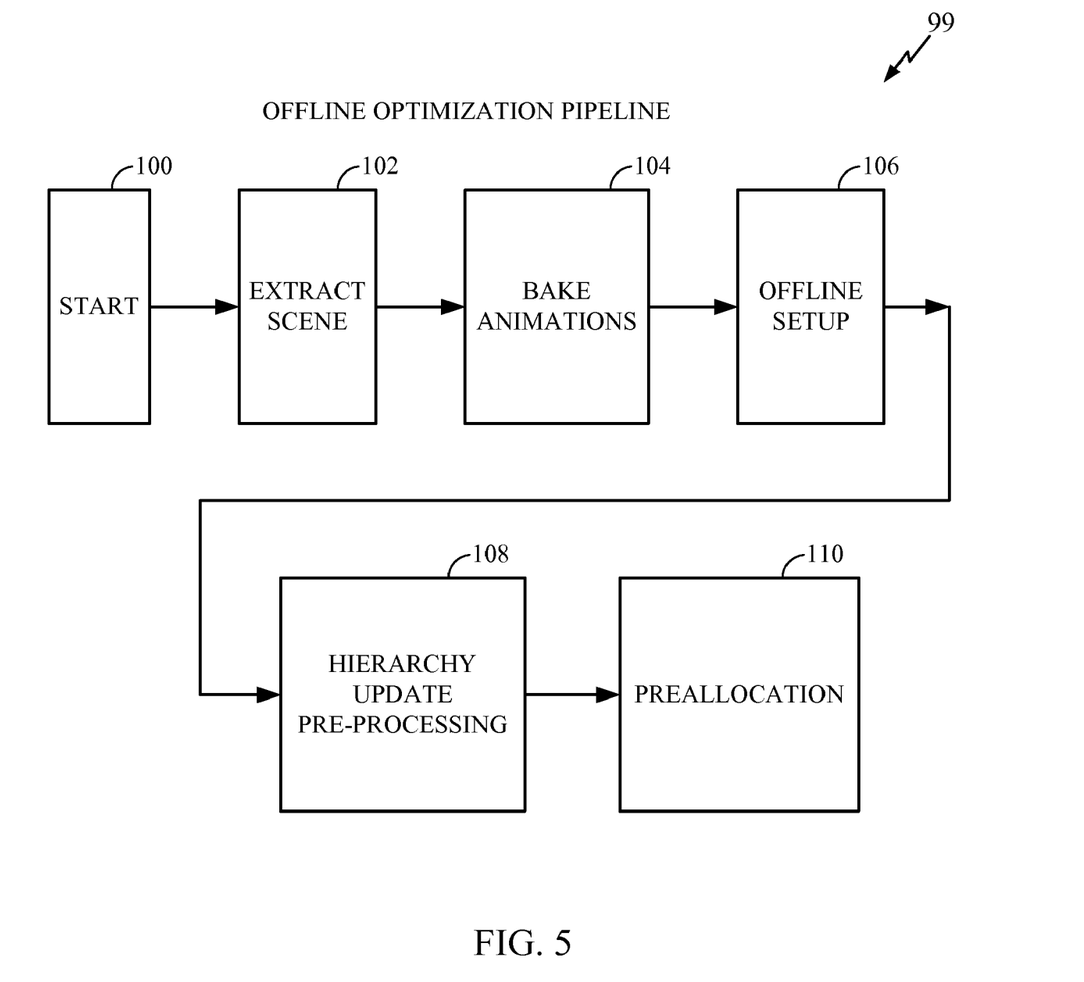
FIG. 5 is a block diagram of an offline optimization pipeline.

FIG. 5 is a block diagram of an example offline optimization pipeline 99 which can be used to implement the offline optimization engine 18 shown in FIG. 1. The offline optimization pipeline 99 shown in FIG. 5 starts with a start stage 100. In the start stage, data validation and general setup are carried out to facilitate the remainder of the optimization process. After the start stage 100, the pipeline proceeds to an extract scene stage 102. In the extract scene stage 102, the pipeline extracts the data that will be processed in the pipeline for a particular scene in the 3D user interface. Subsequent stages, consecutively, include a bake animations stage 104, an offline setup stage 106, a hierarchy update pre-processing stage 108, and a pre-allocation stage 110.

In the bake animations stage 104, animations for the extracted scene are baked to reduce processing time in performing 3D animation updates in the target embedded device, and the baked animations are compressed to reduce the space occupied by animation data in the target embedded device. In the offline setup stage 106, various processing steps are performed, including, e.g., bookkeeping, index structuring, data preparation, and memory allocation.

Figure 6:
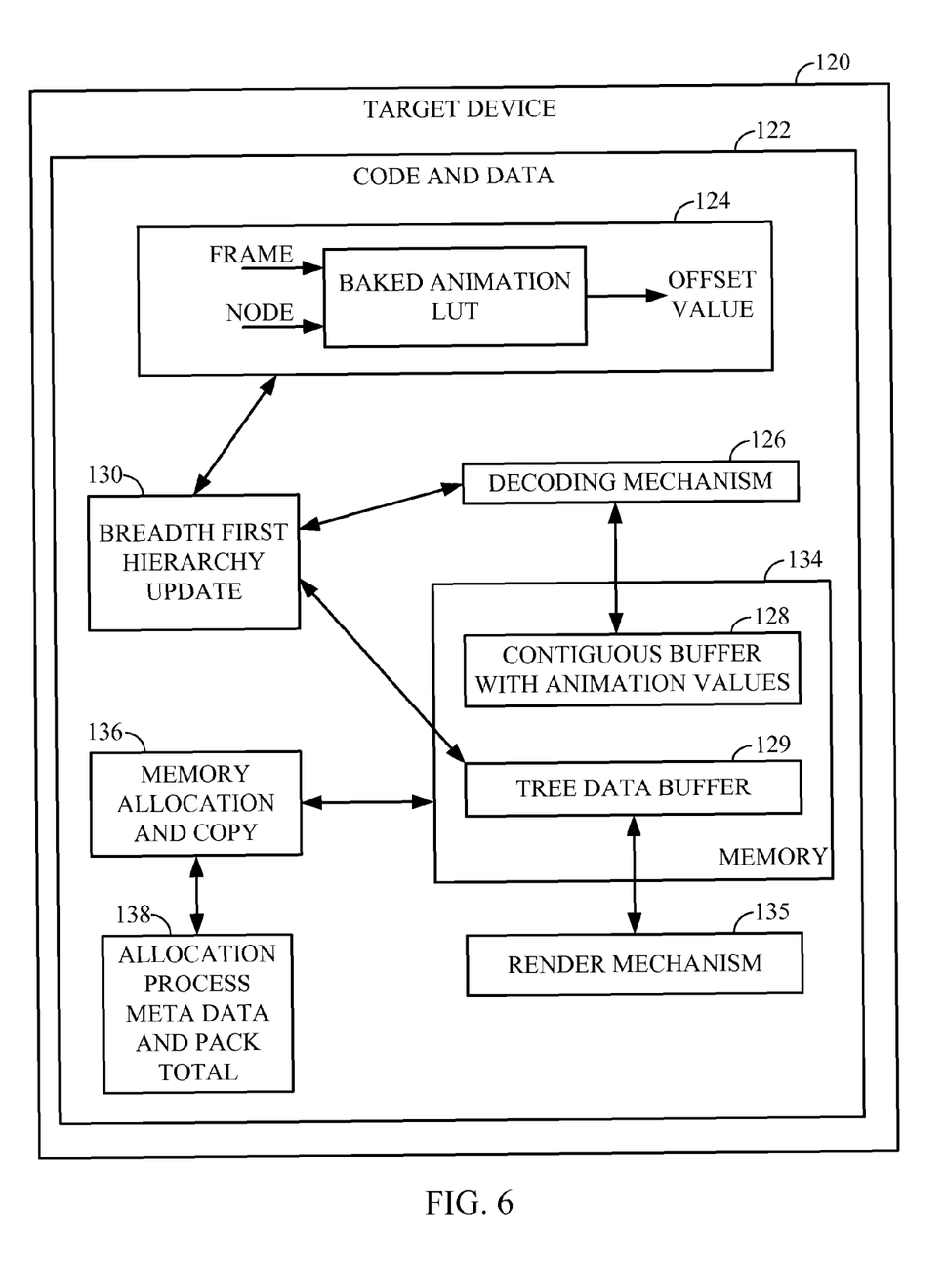
FIG. 6 is a schematic diagram of select code and data in a target embedded device.

In the subsequent hierarchy update pre-processing stage 108, each of the hierarchies for the extracted scene are (for 3D models and for animations) rearranged so that a hierarchy update, including a conversion from local coordinates to world coordinates, in the target embedded device, will involve a non-recursive tree traversal by performing a breadth first traversal of the hierarchy tree. In addition, in this stage, the nodes of the tree are compressed, and the hierarchy is packed into a single contiguous buffer, including the nodes that need to be present in order to allow the target embedded device to perform the hierarchy update on the fly. In the illustrated embodiment, this buffer will take the form of tree data buffer 129 (as shown in FIG. 6), once it is exported to the target device.

In the pre-allocation stage 110, every data structure that will be required for the extracted scene will be identified and a memory allocation required in the target embedded device will be determined. This results in a total memory allocation figure (otherwise sometimes referred to herein as a pack total) that can be utilized in the target embedded device to perform a single memory allocation call (using the MALLOC call of ANSI C, for example), in comparison to the numerous memory allocation calls that might be necessary otherwise.

Figure 7:
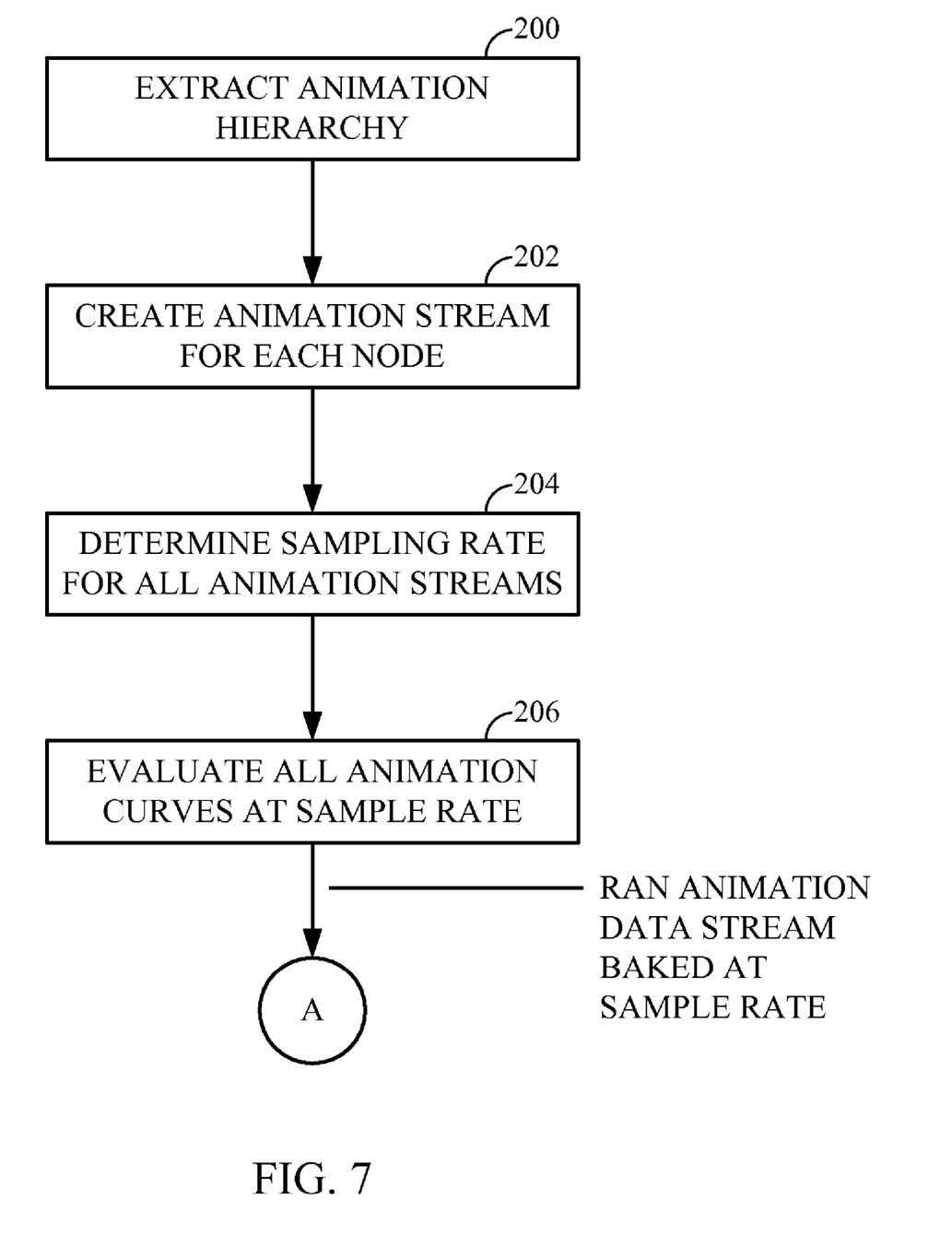
FIGS. 7 and 8 illustrate a flow chart of a process for baking animations.
Figure 8:
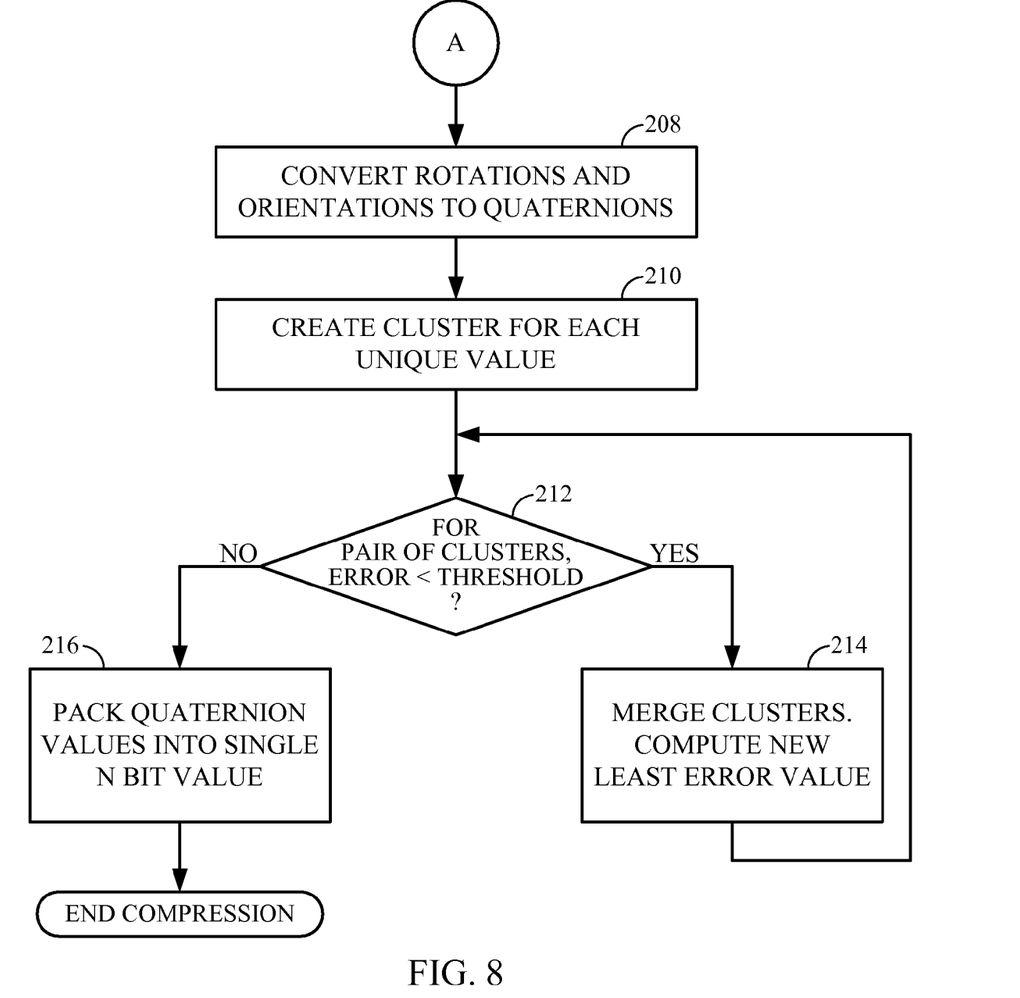

FIGS. 7 and 8 depict a flow chart of a process for baking animations and for compressing the baked animations.

The illustrated flow chart shown in FIGS. 7 and 8 is provided to optimize animation updates on the target embedded device by pre-evaluating animation curves in an offline step. The illustrated embodiment shown in FIGS. 7 and 8 produces (as shown in FIG. 6) a baked animation lookup table (LUT) 124, which will be part of code and data 122 ultimately in target embedded device 120.

In the illustrating baking process shown in FIGS. 7 and 8, in an initial act 200, animation hierarchy is extracted from the extracted scene. In a next act 202, an animation stream is created for each node of the extracted hierarchy. In act 204, the sampling rate is determined for all animation streams that have been created. In this regard, a user may choose a particular sampling rate. Generally, the sampling rate is much higher than the standard rate of frames in which the frames of an animation are stored in the animation file 26 exported by exporter 30, as shown in FIG. 1. The sampling rate can be adjusted using an iterative process. For example, an author may simulate the resulting script of a 3D user interface application, with a particular sampling rate having been chosen. If the quality of the resulting graphics is not sufficient given the expectations of the author, the sample rate may be changed accordingly.

In a next act 206, all (or a subset, in an alternate embodiment) of animation curves are evaluated at the chosen sample rate. At this point, a raw animation data stream has been obtained, which has been baked at the determined sample rate. This data is stored in the offline platform.

By way of example, this raw animation data can be stored in an indexed array (not shown), with each row in the indexed array accessible by inputting into the array an index value, e.g., determined with the use of an index look-up table (LUT) (not shown). The indexed array stores in respective rows sets of attributes, with each row being associated with a particular node and frame. These attributes may, e.g., be x, y, z, r11, r12, r13, r21, r22, r23, r31, r32, r33, and color. The x, y, and z attributes may be local coordinates of a scene, or part of a scene. The attributes r11, r12, r13, r21, r22, r23, r31, r32, r33 are rotation and orientation values that may, e.g., correspond to a 3×3 matrix.

In a next act 208, the rotation and orientation values for each frame/node combination (from the baked raw animation data stream) are converted to quaternions. Quaternions are another way of representing rotations and orientations, for example, instead of using Euler angles and matrices. A quaternion may be represented by 4 values ($\alpha$, $\beta$, $\gamma$, $\omega$). Thus, in this example, the 9 rotation and orientation values may be transformed into 4 quaternion values.

In a next act 210, a cluster is created for each unique value within the quaternions that have been converted from the rotations and orientations of the baked raw animation data stream. In the illustrated embodiment, a cluster is a 7-tuple value which may be formed by using a local set of coordinates (x,y,z) and a quaternion value ($\alpha$, $\beta$, $\gamma$, $\omega$). In one aspect, the cluster may be formed when the 7-tuple value is unique. Thus, if there are M rows of data in the baked raw animation data (i.e., corresponding to respective different combinations of frame and node values), there may be N clusters, where N is less than M, because of non-unique 7-tuple values. A cluster may be composed of a cluster vector (x,y,z), and a cluster quaterion ($\alpha$, $\beta$, $\gamma$, $\omega$).

In a next act 212, a determination is made for a given pair of clusters as to whether the error between those clusters is less than a given threshold. Each cluster is provided with an error value. By way of example, this error value may be the midpoint value of the respective clusters.

For example, a cluster pair may be identified by operating on the 7-tuple in two spaces: (1) a cartesian space (x,y,z); and (2) a quarternion space. In the Cartesian space, the magnitude of the midpoint between any two cluster vectors may generate a midpoint value, mpv1. Similarly, in the quaternion space, the magnitude of the midpoint arc distance between any two cluster quaterions may generate a midpoint value, mpv2.

When the determination at act 212 determines that the error is less than the threshold, the process proceeds to act 214, where that pair of clusters is merged into a new cluster, and a new least error value (i.e., a midpoint magnitude value) is computed for that newly merged cluster. The process returns to act 212, for evaluation of another pair of clusters.

This clustering process can be considered a method of reducing the number of rows of data corresponding to unique frame-node pairs, so that a plurality of unique frame-node pairs that may have animation data (generally, translation information, orientation and rotation information) has the same set of clustered data.

When no more pairs of clusters meet the conditions of act 212, the process proceeds to act 216, at which point, for a given set of animation values for a given cluster, the quaternion values (generally four different values) are packed into a single binary word (e.g., of N bits; N may be, e.g., 32 bits).

After act 216, the compression process is ended.

The clusters can be made larger or smaller to increase animation playback accuracy or to reduce file size, respectively. Once the streams are compressed, the individual values in the animation streams are packed into a single contiguous memory buffer, which is aligned and optimized for the mobile device's cache line characteristics.

Once the animation stream is compressed, the individual values in the animation stream are packed into a single contiguous animation value memory buffer 128, which is ultimately exported to the target embedded device 120, as shown in FIG. 6.

As shown in FIG. 6, in order for a given process of the target device to access data in animation value buffer 128, an animation lookup table (LUT) 124 is provided that outputs, for each unique frame-node combination, an offset value that locates the corresponding animation data in buffer 128.

Figure 9:
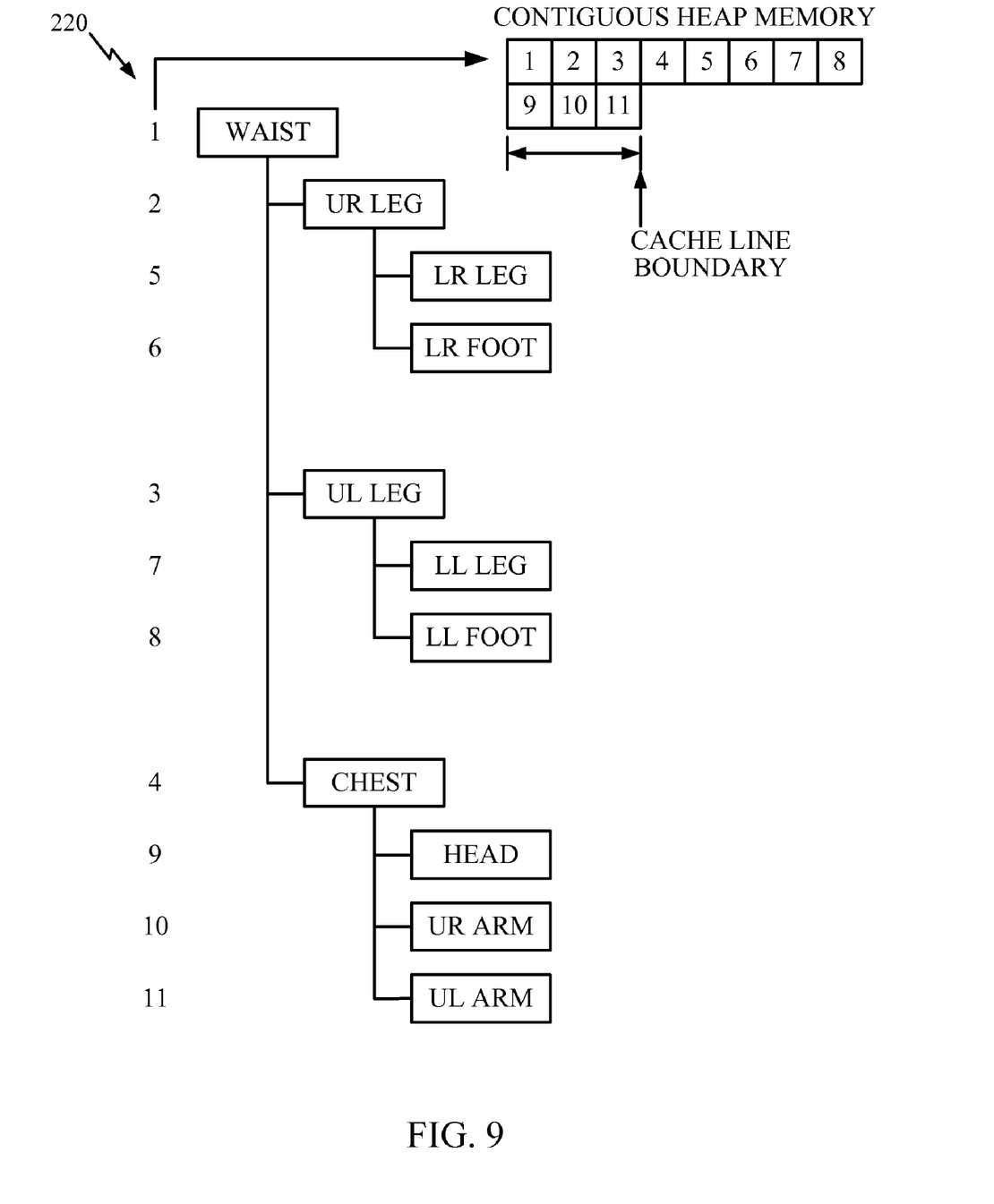
FIG. 9 is a diagram that illustrates a process for performing hierarchy update pre-processing on 3D model and animation data.

FIG. 9 is a schematic diagram of a 3D object hierarchy 220. The illustrated object hierarchy 220 is of a biped, including a waist, which is a root node. An upper right leg, an upper left leg, and a chest are each connected to the waist. Each of these nodes is a child of the waist node. A left lower leg and a left lower foot are each connected to the upper left leg. Each of these nodes is a child node to the upper right leg node, and a grandchild node to the waist node. A lower left leg and a lower left foot node are each coupled to the upper left leg node, are children to the upper left leg node, and are grandchildren to the waist node. Head, upper right arm, and upper left arm nodes are provided which are children to the chest node, and grandchildren to the waist node.

If the hierarchy illustrated in FIG. 9 is updated using a recursive algorithm, where the nodes are processed in a breadth first traversal order, the nodes will be processed in the following order: first the waist node; second the upper right leg node; third the left right leg node; fourth the left right foot node; fifth the upper left leg node; and so on. In contrast, in the embodiment shown in FIG. 9, a breadth first traversal order is used, where the waist node is first processed; the upper right leg node is processed second; the upper left leg node is processed third; and the chest node is process fourth. The order in which the nodes are processed is indicated by the numbers to the left of each of the associated nodes. Accordingly, the waist, upper right leg, upper left leg, and chest nodes are process first, second, third, and fourth respectively, before nodes at the next depth level down are processed. This processing of the nodes ultimately occurs in the target embedded device, but the order in which these nodes is processed can be controlled by controlling the order in which these nodes are stored in a contiguous portion of a tree data buffer 129 ultimately (as shown in FIG. 6) formed in the heap memory of the target embedded device. Accordingly, a data structure 221 can be provided (offline by the hierarchy update pre-processing stage 108 as shown in FIG. 5), to provide for a contiguous amount of memory and for the storage of these nodes in that memory in the particular order in which they are to be processed ultimately in the target embedded device.

As shown in FIG. 6, breadth first hierarchy update mechanism 130 may be provided as part of code and data 122 in target embedded device 120, for performing on-the-fly hierarchy updates of a particular hierarchy. In order to determine where the data associated with that hierarchy is within animation data buffer 128, breadth first hierarchy update mechanism 130 locates that data in accordance with the offset value provided by baked animation LUT 124.

Once breadth first hierarchy update mechanism 130 locates the data within animation data buffer 128, the data is decoded by decoding mechanism 126 (by converting the data to a homogeneous transform matrix), and the nodes are processed in their consecutive order per the structure of the tree as stored in tree data buffer 129, i.e., the waist node first, the upper right leg node second, the upper left leg node third, and so on per the example in FIG. 9. The updated animation data is then stored, per node, in holding spaces provided for such data in tree data buffer 129.

The breadth first approach processes the nodes of a given tree in this order: the root node first, then child 1, then child 2, . . . child N, grandchild 1, grandchild 2, . . . grandchild M, great grandchild 1, . . . .

In the example shown in FIG. 9, the cache line boundary extends at least the amount of memory that is required for two contiguous nodes. Accordingly, if a cache, provided within a target embedded device has two lines, only one cache miss would be required to process, i.e., update, the hierarchy for the first through the fourth nodes in the example shown in FIG. 9. To facilitate the ability to store two nodes within the space of one cache line boundary, the individual nodes may be compressed, for example, using the compression that results from the baked animation provided by the baked animation stage 104 as shown in FIG. 5.

A hierarchy update involving a depth first traversal order will generally result in numerous cache misses. Among the reasons for this are the fact that the nodes for the hierarchy are not stored in contiguous memory. In addition, since the traversal is recursive, for each node, the data for each of its parent nodes all the way to the ultimate root note is required for processing and updating that node.

For purposes of the discussion regarding the updating of hierarchy, for example, in relation to the example shown in FIG. 9, updating refers to the conversion of a node from its local coordinates to world coordinates, before rendering on a display of the target embedded device.

An advantage of the approach of organizing the node data in the example shown in FIG. 9, is that the use of the stack in the target device for updating hierarchy information can be eliminated for this process. Moreover, there is no need to emulate a stack in the heap of the memory of the target embedded device. In addition, the total space consumed in the heap memory of the target embedded device is minimized, so that larger hierarchy trees can be accommodated.

As shown in FIG. 6, once node data is updated by breadth first hierarchy update mechanism 130, it is ready for rendering by render mechanism 135.

Figure 10:
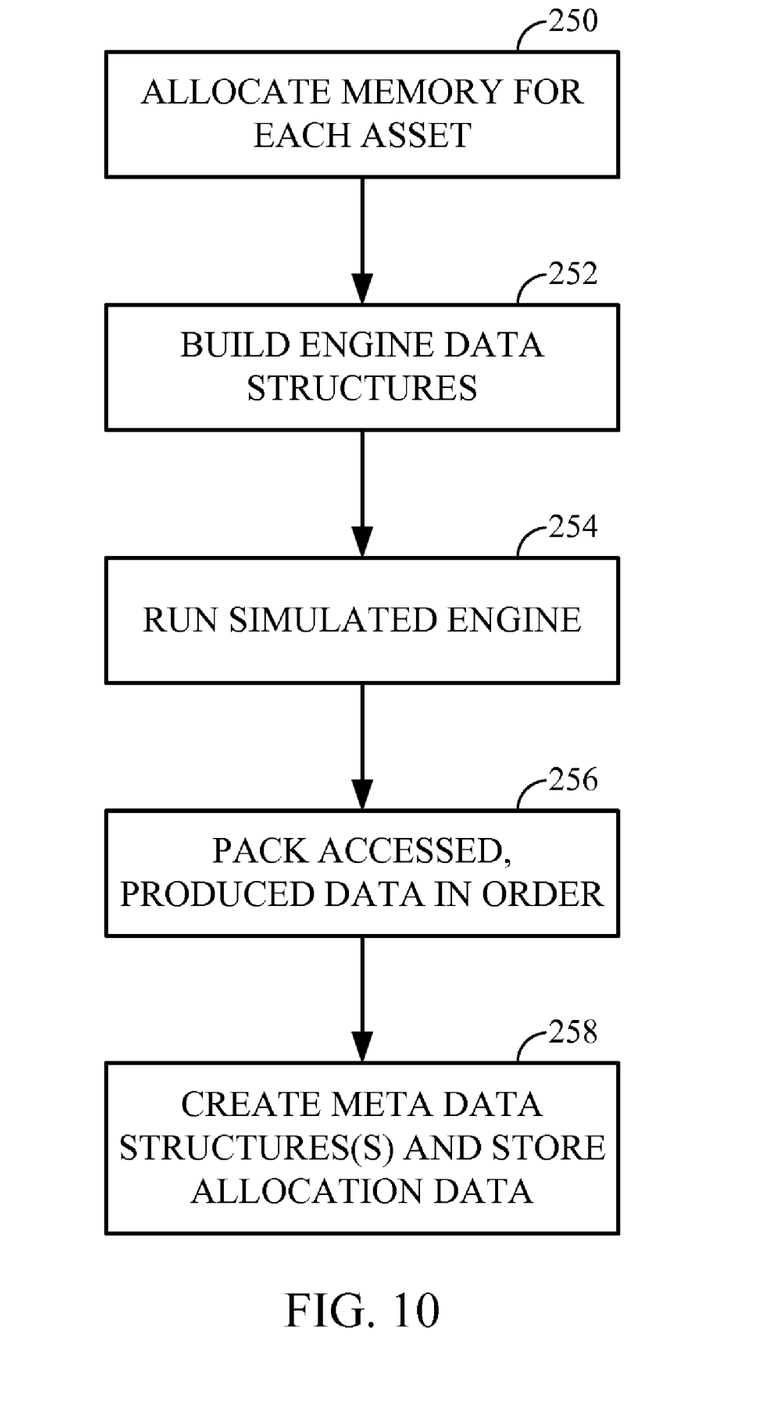
FIG. 10 is a flow chart of a pre-allocation process for determining, among other things, the memory space that will be required in the embedded device.

FIG. 10 shows a flow chart of a pre-allocation process. In a first act 250, memory is allocated for each asset, and for each data structure created up until this point in offline optimization pipeline 99. In act 252, any engine data structures that will be in the target embedded device, when it runs the script and performs all necessary operations, will be built. In act 254, the target simulator 19 simulates the target device, which may involve, for example, emulation of heap, stack, and cache memories within the simulated target embedded device. Target simulator 19 may further simulate all the data structures of the engine for each of the assets in the 3D program.

In act 256, all of the data accessed by the simulated engine, or created by the simulated engine, is packed in the order of engine access or creation into contiguous portions of a "simulated" heap memory. In act 258, meta data structures helpful to the engine in the target embedded device may be created. In addition, the allocation data resulting from the pre-allocation process is stored. Generally, the allocation data includes the total memory space and size of the contiguous memory that was packed in act 256.

The allocation process shown in FIG. 10, which is performed in pre-allocations stage 110 of off-line optimization pipeline 99 as shown in FIG. 5, causes, ultimately, in target embedded device 120, memory allocation and copy actions to be taken by memory allocation and copy mechanism 136, in accordance with meta data and pack total data 138 produced as a result of the pre-allocation process. Specifically, a single memory allocation may be made within memory 134 of target embedded device 120, at the start of the execution of the 3D application, as well as a single memory copy of all data that was packed during the packing act 256 in the pre-allocation process. Any built engine data structures that were built offline can then be copied into the memory, resulting in a single allocation and a single memory copy being required to prepare the data for use in the target embedded device. This minimizes the allocations required for the target embedded device. In addition, start up and initialization times of the target embedded device can be minimized, since all of the packed data is loaded at one time into the target embedded device memory.

The processing performed by each of the elements shown in the figures herein may be performed by a general purpose computer, and/or by a specialized processing computer. Such processing may be performed by a single platform, by a distributed processing platform, or by separate platforms. In addition, such processing can be implemented in the form of special purpose hardware, or in the form of software being run by a general purpose computer. Any data handled in such processing or created as a result of such processing can be stored in any type of memory. By way of example, such data may be stored in a temporary memory, such as in the RAM of a given computer system or subsystems. In addition, or in the alternative, such data may be stored in longer-term storage devices, for example, magnetic discs, rewritable optical discs, and so on. For purposes of the disclosure herein, computer-readable media may comprise any form of data storage mechanism, including such memory technologies as well as hardware or circuit representations of such structures and of such data. The processes may be implemented in any machine-readable media and/or in an integrated circuit.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example may arise from applicants/patentees, and others.

What is claimed is:

1. An apparatus comprising:
   a computer-readable media embodied three-dimensional (3D) application in a computer platform other than a target mobile device; and
   a baking mechanism operative in an offline engine of the computer platform to bake animation data into an animation data structure to be loaded into a graphics engine of the target mobile device, the baking mechanism operative to convert frame-node combinations of an animation stream into clusters, to determine whether an error between a particular pair of clusters satisfies a predetermined threshold, and to merge the particular pair of clusters to create a new cluster when the error satisfies the predetermined threshold.

2. The apparatus according to claim 1,
   wherein the 3D application includes a 3D user interface application,
   wherein the offline engine is operative to process data to be acted upon by the graphics engine of the target mobile device,
   wherein the animation data includes node location data, orientation data, and rotation data for nodes in a display frame to be displayed upon rendering an animated scene; and
   wherein the animation data is retrievable from storage based on a baked animation lookup table responsive to a frame input and a node input.

3. The apparatus according to claim 1, wherein the offline engine includes a data structure mechanism operative to create and prepare data structures to be acted upon by the graphics engine of the target mobile device by extracting a hierarchy structure from an animated scene, creating the animation stream for each node of the hierarchy structure, selecting a sampling rate for each animation stream, evaluating animation curves at each selected sampling rate, and converting frame-node combinations of the animation stream into quaternion values, wherein the clusters are formed from the quaternion values.

4. The apparatus according to claim 1, further comprising a graphics engine simulator operative in the computer platform to simulate select functions of the target mobile device running the graphics engine including application programming interface (API) calls that directly call API functions of a hardware level API of the target mobile device.

5. An apparatus comprising:
   a mobile device including a graphics engine;
   a mobile device asset load mechanism operative to load an asset produced from an offline computer platform into the graphics engine, the mobile device asset load mechanism using a single allocation to prepare the asset for use; and
   a node processing hierarchy update mechanism operative to perform hierarchy updates based on update data provided at an animation data buffer of the mobile device using a breadth-first traversal of the hierarchy.

6. The apparatus according to claim 5,
   wherein the asset includes assets defining three-dimensional (3D) models, including 3D icons, and animations of the 3D models, and
   wherein a location of the update data in the animation data buffer is determined in accordance with an offset value provided at a baked animation look up table.

7. An apparatus comprising:
   assets defining three-dimensional (3D) models, including 3D icons and scenes, and animations of the 3D models; and
   an off-line optimization engine operative in a computer platform other than a target embedded device to process data to be acted upon by a graphics engine of the target embedded device, the off-line optimization engine comprising:
   a hierarchy update pre-processing mechanism operative to establish an order of processing of nodes in a 3D object, wherein the nodes are stored in a memory in a particular order for processing by the graphics engine, and wherein at least two contiguous nodes are sized for storage in a cache line.

8. The apparatus according to claim 7, wherein the assets defining the 3D models, and the animations of the 3D models are exported assets having been exported from a 3D image defining system.

9. The apparatus according to claim 8, wherein the off-line optimization engine includes a pipeline.

10. The apparatus according to claim 9, further comprising:
    a scripting language interface operative to receive script statements defining a 3D user interface via a computer screen input, and to generate a set of script files representing the script statements defining the 3D user interface.

11. The apparatus according to claim 10, further comprising:
    icon association mechanisms operative to associate a given 3D object in a scene in a interface tool of a mobile phone to cause at least one of an input and an output of a signal regarding the mobile phone by manipulation of the given 3D object.

12. The apparatus according to claim 7, further comprising:
    a graphics engine simulator operative in the computer platform to simulate select functions of the target embedded device running the graphics engine including application programming interface (API) calls that directly call API functions of a hardware level API of the target embedded device.

13. The apparatus according to claim 7, the off-line optimization engine further comprising:
    a baking mechanism operative in the computer platform to bake animation data into an animation data structure to be loaded into the graphics engine of the target embedded device, wherein the animation data includes node location data, orientation data, and rotation data for nodes in a display frame to be displayed upon rendering an animated scene.

14. The apparatus according to claim 13, the baking mechanism further comprising:
a conversion mechanism operative to convert the orientation data and the rotation data to quaternions;
a cluster mechanism operative to cluster groups of values; and
a packing mechanism operative to pack groups of quaternion values.

15. The apparatus according to claim 7, wherein the 3D object is a 3D model tree, wherein the hierarchy update pre-processing mechanism is operative to arrange processed node holding places in a tree data buffer for export to the target embedded device.

16. The apparatus according to claim 15, wherein the established order of processing of the nodes is a breadth-first traversal order of the 3D model tree.

17. The apparatus according to claim 16, wherein the processed node holding places are each compressed holding places in relation to an amount of memory space required to hold node information in an unmodified format.

18. The apparatus according to claim 7, the off-line optimization engine further comprising:
a pre-allocation mechanism in the computer platform, the pre-allocation mechanism comprising:
an engine data structure builder operative to build engine data structures;
a simulated engine;
a simulation data packer operative to pack data accessed and produced by the simulated engine and to pack built engine data structures; and
a pack total determiner.

19. A method comprising:
storing a three-dimensional (3D) application in a computer platform other than a target mobile device; and
baking animation data in an offline engine of the computer platform into an animation data structure to be loaded into a graphics engine of the target mobile device, the baking further comprising:
converting frame-node combinations of an animation stream into clusters;
determining whether an error between a particular pair of clusters satisfies a predetermined threshold; and
merging the particular pair of clusters to create a new cluster when the error satisfies the predetermined threshold.

20. The method according to claim 19, wherein the 3D application includes a 3D user interface application, wherein the animation data is retrievable from storage based on an output of a baked animation lookup table responsive to a frame input and a node input.

21. The method according to claim 20, further comprising simulating, on the computer platform, select functions of the target mobile device running the graphics engine including application programming interface (API) calls that directly call API functions of a hardware level API of the target mobile device.

22. The method according to claim 19, further comprising:
creating and preparing data structures to be acted upon by the graphics engine of the target mobile device by extracting a hierarchy structure from an animated scene, creating the animation stream for each node of the hierarchy structure, selecting a sampling rate for the animation stream for each node, evaluating animation curves at each selected sampling rate, converting frame-node combinations of the animation stream into quaternion values, and creating a cluster for each unique quaternion value, wherein the clusters are formed from the quaternion values.

23. A method comprising:
providing a mobile device including a graphics engine;
loading an asset produced from an offline computer platform into the graphics engine, the loading using a single allocation to prepare the asset for use; and
updating a node processing hierarchy based on update data provided at an animation data buffer of the mobile device using a breadth-first traversal of the node processing hierarchy.

24. The method according to claim 23, wherein the asset includes assets defining three-dimensional (3D) models, including 3D icons, and animations of the 3D models, the method further comprising:
determining a location of the update data in the animation data buffer based on an offset value provided at a baked animation look up table.

25. A method comprising:
storing assets defining three-dimensional (3D) models, including 3D icons and scenes, and animations of the 3D models;
processing, on a computer platform other than a target embedded device, data to be acted upon by a graphics engine of the target embedded device, the processing further comprising:
updating a node processing hierarchy to establish an order of processing of nodes in a 3D object, wherein the nodes are stored in a memory in a particular order for processing by the graphics engine, and wherein at least two contiguous nodes are sized for storage in a cache line; and
simulating, on the computer platform, select functions of the target embedded device running the graphics engine including application programming interface (API) calls that directly call API functions of a hardware level API of the target embedded device.

26. The method according to claim 25, wherein the assets defining the 3D models, and the animations of the 3D models, are exported assets having been exported from a 3D image defining system.

27. The method according to claim 25, the processing further comprising:
baking animation data in the computer platform into an animation data structure to be loaded into the graphics engine of the target embedded device, wherein the animation data includes node location data, orientation data, and rotation data for nodes in a display frame to be displayed upon rendering an animated scene.

28. The method according to claim 27, wherein the baking includes converting the orientation data and the rotation data to quaternions, clustering groups of values, and packing groups of quaternion values.

29. The method according to claim 25, wherein the 3D object is a 3D model tree, wherein performing hierarchy update pre-processing comprises arranging processed node holding places in a tree data buffer for export to the target embedded device.

30. The method according to claim 29, wherein the established order of processing of the nodes is a breadth-first traversal order of the 3D model tree.

31. The method according to claim 30, wherein the processed node holding places are each compressed holding places in relation to an amount of memory space required to hold node information in an unmodified format.

32. The method according to claim 25, the processing further comprising:
  performing a pre-allocation in the computer platform, the pre-allocation comprising:
    building engine data structures;
    simulating an engine;
    packing data accessed and produced by the simulated engine and packing built engine data structures; and
    determining a pack total.

33. Machine-readable storage media encoded with data, the encoded data being interoperable with a machine to cause:
  storing a three-dimensional (3D) application in a computer platform other than a target mobile device; and
  baking animation data in an offline engine of the computer platform into an animation data structure to be loaded into the graphics engine of the target mobile device, the baking further comprising:
    converting frame-node combinations of an animation stream into clusters;
    determining whether an error between a particular pair of clusters satisfies a predetermined threshold; and
    merging the particular pair of clusters to create a new cluster when the error satisfies the predetermined threshold.

34. The machine-readable storage media according to claim 33, wherein the 3D application includes a 3D user interface application, wherein the animation data is retrievable from storage based on an output of a baked animation lookup table responsive to a frame input and a node input.

35. The machine-readable storage media according to claim 34, wherein the encoded data is interoperable with the machine to further cause simulating, on the computer platform, select functions of the target mobile device running the graphics engine including application programming interface (API) calls that directly call API functions of a hardware level API of the target mobile device.

36. The machine-readable storage media according to claim 33, wherein the encoded data is interoperable with the machine to further cause creating and preparing data structures to be acted upon by the graphics engine of the target mobile device, by extracting a hierarchy structure from an animated scene, creating the animation stream for each node of the hierarchy structure, selecting a sampling rate for the animation stream for each node, evaluating animation curves at each selected sampling rate, converting frame-node combinations of the animation stream into quaternion values, creating a cluster for each unique quaternion value, wherein the clusters are formed from the quaternion values.

37. Machine-readable storage media encoded with data, the encoded data being interoperable with a machine to cause:
  loading an asset produced from an offline computer platform into a graphics engine of a mobile device, the loading using a single allocation to prepare the asset for use; and
  updating a node processing hierarchy based on update data provided at an animation data buffer of a mobile device using a breadth-first traversal of the node processing hierarchy.

38. The machine-readable storage media according to claim 37, wherein the asset includes assets defining three-dimensional (3D) models, including 3D icons, and animations of the 3D models, the encoded data being interoperable with the machine to further cause:
  determining a location of the update data in the animation data buffer based on an offset value provided at a baked animation look up table.

39. Machine-readable storage media encoded with data, the encoded data being interoperable with a machine to cause:
  storing assets defining three-dimensional (3D) models, including 3D icons and scenes, and animations of the 3D models;
  processing, on a computer platform other than a target embedded device, data to be acted upon by a graphics engine of a target embedded device, the processing further comprising:
    updating a node processing hierarchy to establish an order of processing of nodes in a 3D object, wherein the nodes are stored in a memory in a particular order for processing by the graphics engine, and wherein at least two contiguous nodes are sized for storage in a cache line; and
  simulating, on the computer platform, select functions of the target embedded device running the graphics engine including application programming interface (API) calls that directly call API functions of a hardware level API of the target embedded device.

40. The machine-readable storage media according to claim 39, wherein the assets defining the 3D models, and the animations of the 3D models, are exported assets having been exported from a 3D image defining system.

41. The machine-readable storage media according to claim 39, the processing further comprising:
  baking animation data in the computer platform into an animation data structure to be loaded into the graphics engine of the target embedded device, wherein the animation data includes node location data, orientation data, and rotation data for nodes in a display frame to be displayed upon rendering an animated scene.

42. The machine-readable storage media according to claim 41, wherein the baking further includes converting the orientation data and the rotation data to quaternions, clustering groups of values, and packing groups of quaternion values.

43. The machine-readable storage media according to claim 39, wherein the 3D object is a 3D model tree, wherein performing hierarchy update pre-processing comprises arranging processed node holding places in a tree data buffer for export to the target embedded device.

44. The machine-readable storage media according to claim 43, wherein the established order of processing of the nodes is a breadth-first traversal order of the 3D model tree.

45. The machine-readable storage media according to claim 44, wherein the encoded data is interoperable with the machine to further cause the processed node holding places to be each compressed holding places in relation to an amount of memory space required to hold node information in an unmodified format.

46. The machine-readable storage media according to claim 39, the processing further comprising:
  performing a pre-allocation in the computer platform, the pre-allocation including:
    building engine data structures;
    simulating an engine;
    packing data accessed and produced by the simulated engine and packing built engine data structures; and
    determining a pack total.

47. An apparatus comprising:
  means for storing a three-dimensional (3D) application in a computer platform other than a target mobile device; and
  means for baking animation data in an offline engine of the computer platform into an animation data structure to be loaded into a graphics engine of the target mobile device, the means for baking further comprising:
    means for converting frame-node combinations of an animation stream into clusters;
    means for determining whether an error between a particular pair of clusters satisfies a predetermined threshold; and
    means for merging the particular pair of clusters to create a new cluster when the error satisfies the predetermined threshold.

48. The apparatus according to claim 47, wherein the 3D application includes a 3D user interface application, wherein the animation data is retrievable from storage based on an output of a baked animation lookup table responsive to a frame input and a node input.

49. The apparatus according to claim 48, further comprising means for simulating, on the computer platform, select functions of the target mobile device running the graphics engine including application programming interface (API) calls that directly call API functions of a hardware level API of the target mobile device.

50. The apparatus according to claim 47, further comprising means for creating and preparing data structures to be acted upon by the graphics engine of the target mobile device, by extracting a hierarchy structure from an animated scene, creating the animation stream for each node of the hierarchy structure, selecting a sampling rate for the animation stream for each node, evaluating animation curves at each selected sampling rate, converting frame-node combinations of the animation stream into quaternion values, creating a cluster for each unique quaternion value, wherein the clusters are formed from the quaternion values.

51. An apparatus comprising:
    means for loading an asset produced from an offline computer platform into a graphics engine of a mobile device, the means for loading using a single allocation to prepare the asset for use; and
    means for updating a node processing hierarchy based on update data provided at an animation data buffer of a mobile device using a breadth-first traversal of the processing node hierarchy.

52. The apparatus according to claim 51, wherein the asset includes assets defining three-dimensional (3D) models, including 3D icons, and animations of the 3D models, the apparatus further comprising:
    means for determining a location of the update data in the animation data buffer based on an offset value provided at a baked animation look up table.

53. An apparatus comprising:
    means for storing assets defining three-dimensional (3D) models, including 3D icons and scenes, and animations of the 3D models;
    means for processing, on a computer platform other than a target embedded device, data to be acted upon by a graphics engine of the target embedded device, the means for processing further comprising:
        means for updating a node processing hierarchy to establish an order of processing of nodes in a 3D object, wherein the nodes are stored in a memory in a particular order for processing by the graphics engine, and wherein at least two contiguous nodes are sized for storage in a cache line; and
    means for simulating, on the computer platform, select functions of the target embedded device running the graphics engine including application programming interface (API) calls that directly call API functions of a hardware level API of the target embedded device.

54. The apparatus according to claim 53, wherein the assets defining the 3D models, and the animations of the 3D models, are exported assets having been exported from a 3D image defining system.

55. The apparatus according to claim 53, the means for processing further comprising:
    means for baking animation data in the computer platform into an animation data structure to be loaded into the graphics engine of the target embedded device, wherein the animation data includes node location data, orientation data, and rotation data for nodes in a display frame to be displayed upon rendering an animated scene.

56. The apparatus according to claim 55, wherein the means for baking includes means for converting the orientation data and the rotation data to quaternions, means for clustering groups of values, and means for packing groups of quaternion values.

57. The apparatus according to claim 53, wherein the 3D object is a 3D model tree, the means for updating further comprising means for arranging processed node holding places in a tree data buffer for export to the target embedded device.

58. The apparatus according to claim 57, wherein the established order of processing of the nodes is a breadth-first traversal order of the 3D model tree.

59. The apparatus according to claim 58, wherein the processed node holding places are each compressed holding places in relation to an amount of memory space required to hold node information in an unmodified format.

60. The apparatus according to claim 53, the means for processing further comprising:
    means for performing a pre-allocation in the computer platform, the pre-allocation including:
    building engine data structures;
    simulating an engine;
    packing data accessed and produced by the simulated engine and packing built engine data structures; and
    determining a pack total.

* * * * *